US005080336A

United States Patent [19]

Carossino

[11] Patent Number: 5,080,336

[45] Date of Patent: Jan. 14, 1992

[54] DEVICE FOR CLAMPING WORKPIECES TO BE MACHINED

[75] Inventor: André Carossino, Louveciennes, France

[73] Assignee: Freres Carossino, France

[21] Appl. No.: 580,118

[22] Filed: Sep. 10, 1990

[30] Foreign Application Priority Data

Sep. 11, 1989 [FR] France ............................ 89 11853

[51] Int. Cl.[5] ............................................ B23Q 3/02

[52] U.S. Cl. ........................................ 269/93; 269/94; 269/226

[58] Field of Search ........................... 269/91, 93-94, 269/99-101, 238, 225, 226, 285, 250-253, 249, 257

[56] References Cited

U.S. PATENT DOCUMENTS

| | | | |
|---|---|---|---|
| 1,580,083 | 4/1926 | Boodle | 269/238 |
| 2,395,242 | 2/1946 | Anderson | 269/94 |
| 3,575,405 | 4/1971 | Harding | 269/249 |
| 4,500,081 | 2/1985 | Carossino | 269/94 |
| 4,887,803 | 12/1989 | Witt | 269/94 |

FOREIGN PATENT DOCUMENTS

| | | |
|---|---|---|
| 0115724 | 8/1984 | European Pat. Off. . |
| 245948 | 6/1910 | Fed. Rep. of Germany . |
| 750101 | 6/1910 | Fed. Rep. of Germany . |
| 3513806 | 10/1986 | Fed. Rep. of Germany . |
| 2496530 | 6/1982 | France . |
| 2540768 | 8/1984 | France . |

*Primary Examiner*—Robert C. Watson

*Attorney, Agent, or Firm*—Andrus, Sceales, Starke & Sawall

[57] ABSTRACT

A device for clamping or immobilizing workpieces to be machined includes a casing adapted to be fixed to a worktable and in which is disposed a mobile part rotatable about a horizontal axis. The mobile part has a toothed sector cooperating with a lead screw. It also has an arm forming a lever whose end is adapted to bear on the workpiece to be machined. The arm is removably mounted in the mobile part and able to move in translation in a direction substantially perpendicular to the axis of rotation of the mobile part.

8 Claims, 5 Drawing Sheets

DEVICE FOR CLAMPING WORKPIECES TO BE MACHINED

BACKGROUND OF THE INVENTION

1. Field of the invention

The present invention concerns devices generally employed to hold onto the worktable of a machine tool workpieces to be machined on it.

2. Description of the Prior Art

These clamping devices are usually in the form of a casing which is fixed to a worktable by means of an assembly member cooperating with a block sliding in a groove in the worktable and inside which is a mobile part rotatable about a horizontal axis which has a toothed sector cooperating with a lead screw, said mobile part incorporating an arm forming a lever the end of which bears on the workpiece to be machined.

In known clamping devices the aforementioned arm is attached to the mobile part, which rules out any possibility of adjusting its position relative to the casing.

What is more, in some applications it may be useful to provide an upward clamping or supporting action, by raising the lever arm.

SUMMARY OF THE INVENTION

An object of the present invention is a clamping device of the type described above in which the position of the arm relative to the casing can be adjusted so that upward or downward forces may be applied to the workpiece to be held.

The invention is particularly noteworthy in that the lever arm is removably mounted in the mobile part to enable movement in translation in a direction substantially perpendicular to the axis of rotation of the mobile part.

This arrangement makes it possible to adjust the position of the arm relative to the casing to suit various applications.

According to another characteristic of the invention, the clamping device incorporates an arm shaped to be able to lift a workpiece by engagement with it from below.

As the arm is removable, multiple arms may be provided for the same clamping device and in particular an arm operating upwardly rather than downwardly.

Other characteristics and advantages of the invention will emerge from the following description of one embodiment of the invention given with reference to the appended diagrammatic drawings.

DETAILED DESCRIPTION OF THE PREFERRED EMBODIMENT

Figure 1:
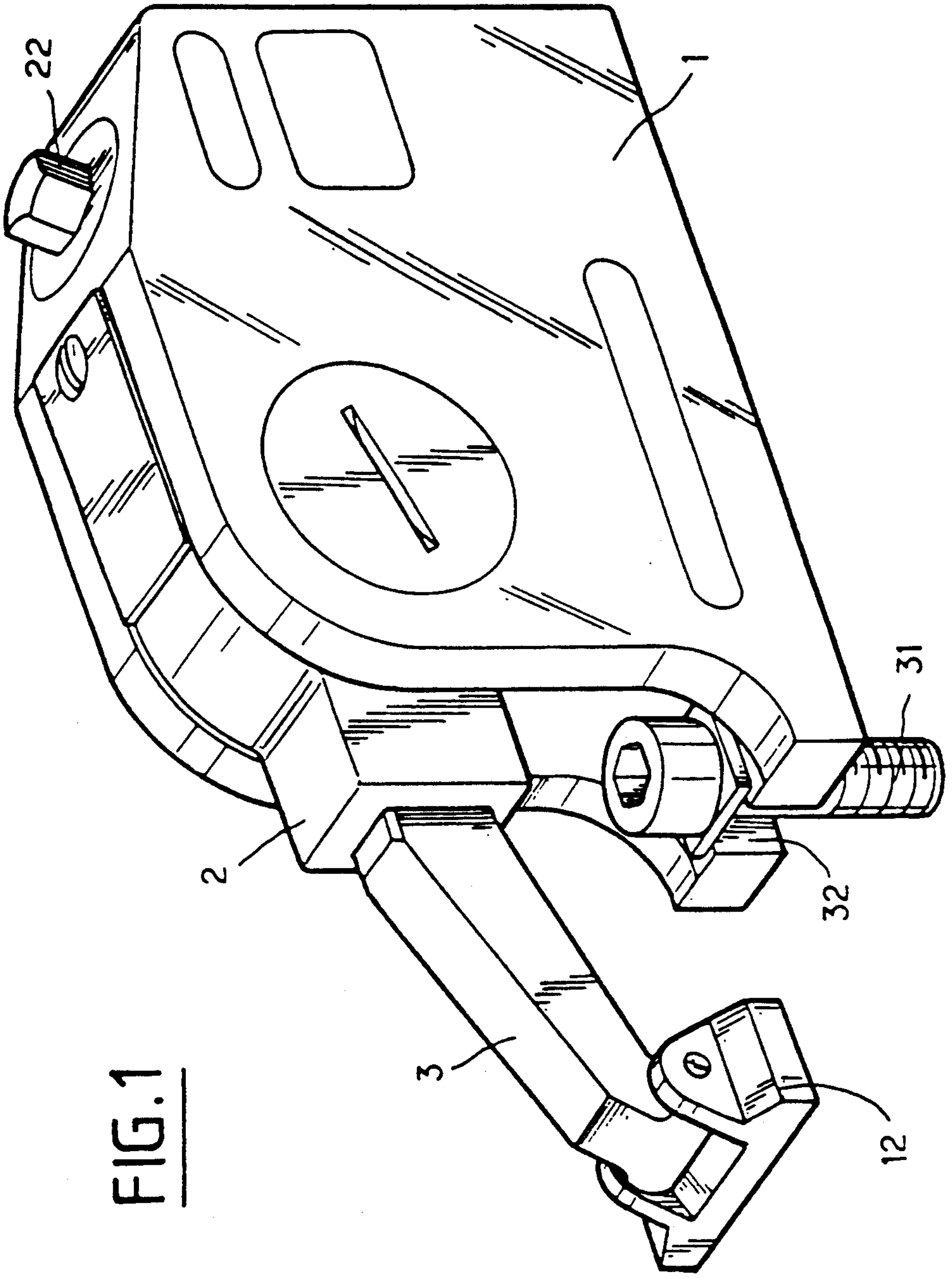
FIG. 1 is a view of a clamping device in accordance with the invention.

The clamping device shown in FIGS. 1 through 4 comprises a casing 1 in which is disposed a mobile part 2 rotatable about a horizontal axis; this rotatable part 2 incorporates a toothed sector 21 which cooperates with a lead screw 4 disposed in a housing to the rear of the casing 1 and which is fixed into this housing by mean of a nut 5 and washer 6. The lead screw has a hexagonal head 22 which projects from the casing so that it can be rotated using a wrench.

In the known way the mobile part 2 incorporates an arm 3 forming a lever whose free end is fitted with a bearing skid 12.

In accordance with the present invention the lever arm 3 is removably mounted in the rotatable part 2 and can slide within the latter perpendicular to the axis of rotation of the rotatable part 2. The arm 3 can advantageously be immobilized within the rotatable part 2 at more than one position. In the embodiment shown the bottom surface of the arm 3 is formed with recesses such as that shown at 23 along its entire length; these recesses cooperate with an immobilizing device 14 consisting of a spring-loaded ball, for example.

Figure 2:
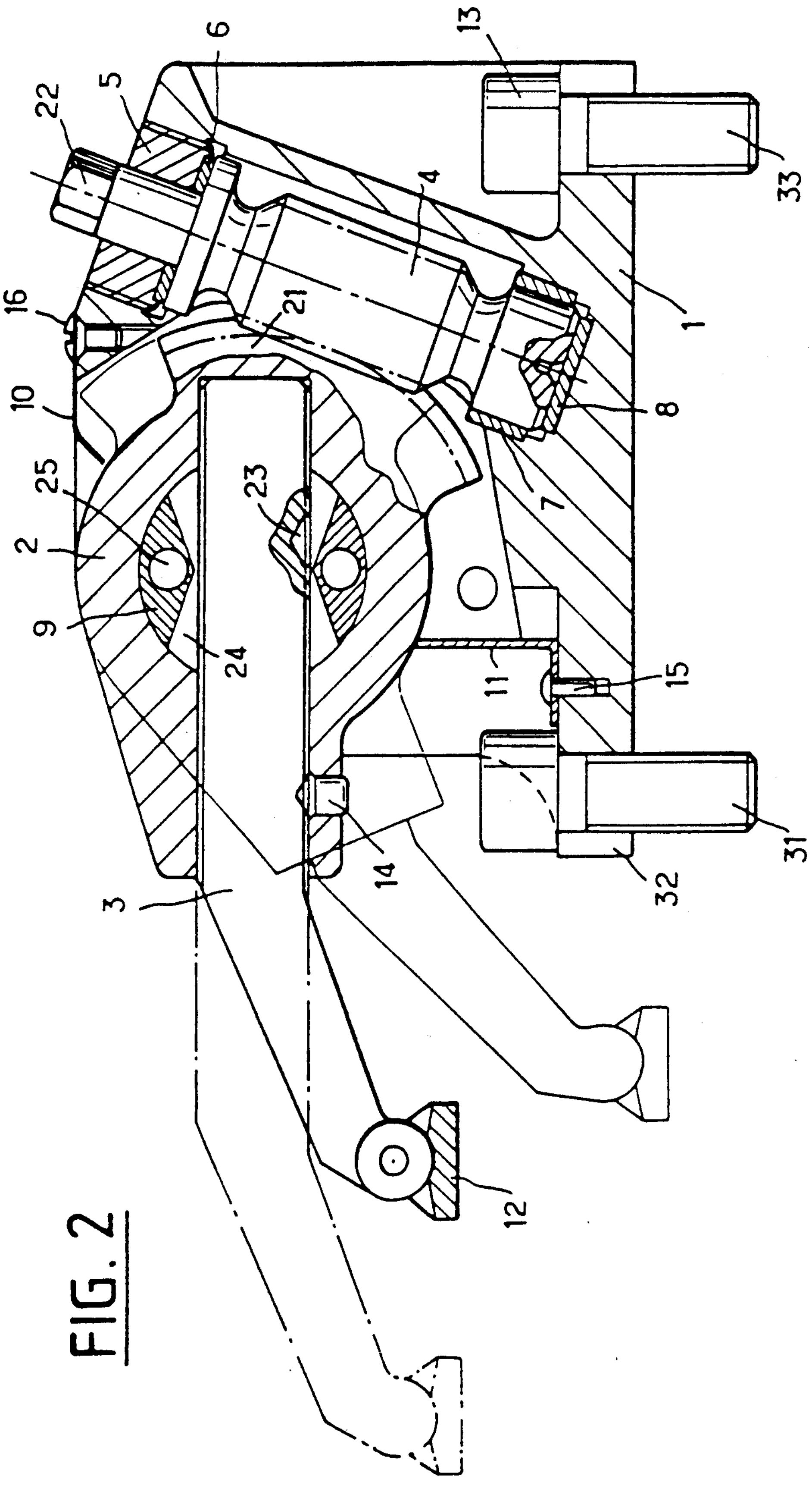
FIG. 2 is a view of the clamping device from FIG. 1 in longitudinal cross-section.
Figure 4:
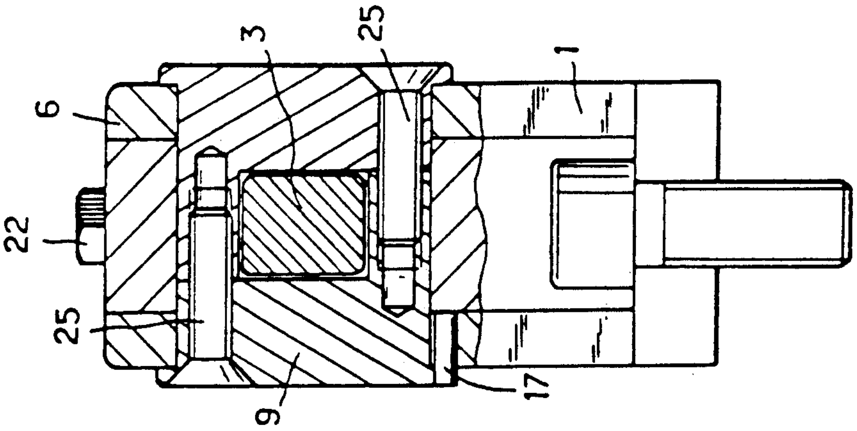
FIG. 4 is a lefthand view partially in cross-section on a plane passing through the center of the mobile part.
Figure 3:
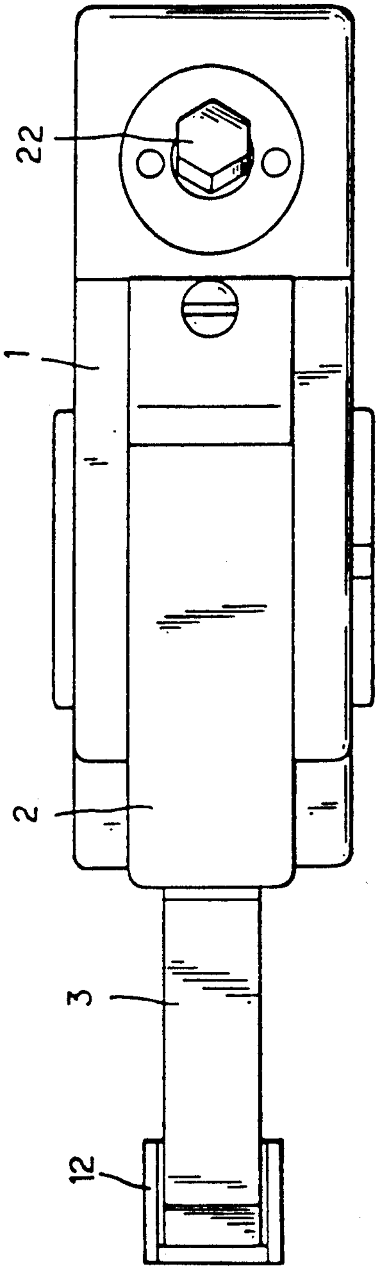
FIG. 3 is a plan view.

As can be seen in FIGS. 2 and 4 in particular, the mobile part 2 incorporates a cylindrical central opening 24 which is coaxial with the rotation axis of the part 2 and within this central opening 24 are two identical circular flanges 9 which are L-shape in transverse cross-section and which are mounted with reverse symmetry or "head-to-tail", as can be seen in FIG. 4 in particular, so as to provide between them a central housing for the arm 3. The two flanges are fixed together by means of two screws 25 each of which passes through one flange and is screwed into a threaded hole in the other flange.

Figure 6C:
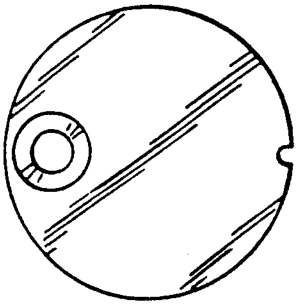
FIGS. 6A, 6B and 6C show a flange respectively from the right, in transverse cross-section and from the left.
Figure 6B:
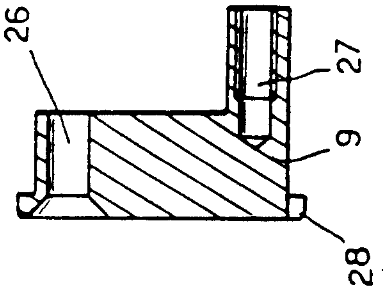
Figure 6A:
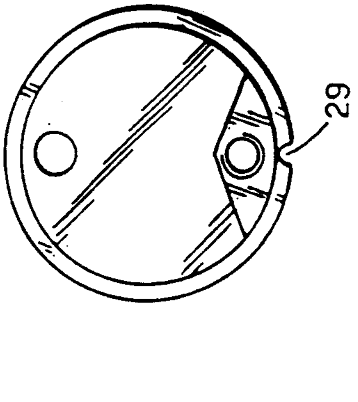
Figure 7A:
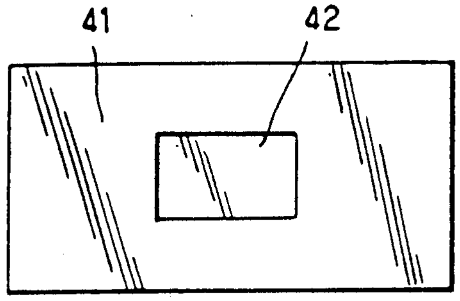
FIGS. 7A through 7D show a bearing skid respectively from below, from above, in longitudinal cross-section and in transverse cross-section.
Figure 7B:
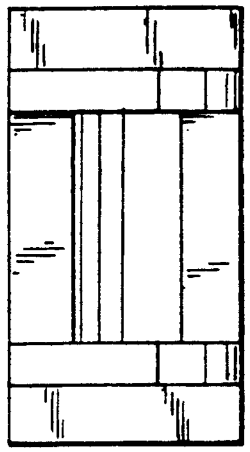
Figure 7C:
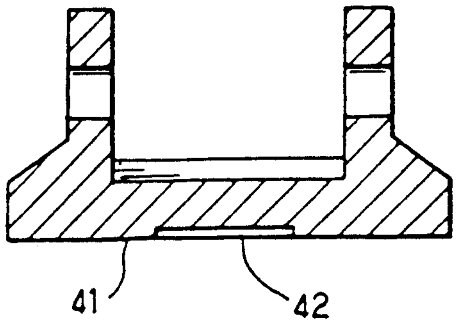
Figure 7D:
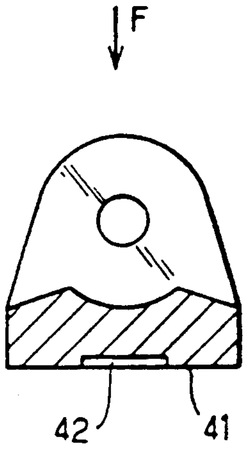

As can be seen in FIGS. 6A, 6B and 6C, which show one of the flanges 6, the latter comprises a smooth hole 26 passing through it perpendicular to one of the branches of the L and a screwthreaded hole 27 disposed axially in the other branch of the L. Each flange has an annular shoulder 28 which bears against the outside surface of the casing 1. As can be seen in FIGS. 6A through 6C, a groove 29 is formed in the annular shoulder 28; the groove 29 cooperates with a pin 17 provided in the part 2 so as to center the combination of the two flanges 9 when assembled together.

The two flanges are designed to increase the surface areas in contact when the mobile part 2 rotates and to enable the casing to be made more rigid by implementing it as a unitary construction.

Figure 5:
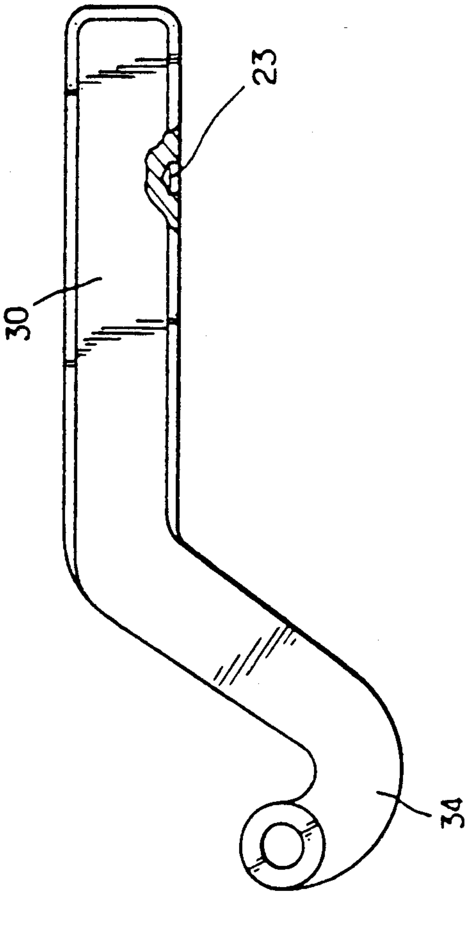
FIG. 5 is a side view of a lifting arm.

According to the invention the arm 3 is removable and different arms can be used, such as that shown in FIG. 5, which is adapted to apply an upward force to hold a workpiece to be machined. As can be seen in FIG. 5, the free end of this arm 30 includes a curved part 34 whose concave side faces upwards so that the bearing skid (not shown in FIG. 5) faces upwards.

Known type clamping devices are usually fixed to the worktable of a machine tool by means of a screw 31 which fits in a notch 32 in the casing 1 and is screwed into a block sliding in a groove in the worktable. In conventional clamping devices a single screw 31 is used at the front of the device, in other words on the same side as the arm 3. In accordance with the invention, a second fixing screw 33 is provided at the rear of the clamping device, in other words at the end opposite the arm 3. The second screw is also inserted into a block sliding in a groove in the worktable and is used to hold the clamping device onto the table when using an arm such as that shown in FIG. 5 which operates upwardly.

As can be seen in FIGS. 7A through 7D, the bearing skid 12 has a contact surface 41 whose length is substantially twice its width; at the center of this contact surface is a recessed area 42 to enable optimum seating of the periphery of the contact surface 41.

The above description has been given by way of illustrative and non-limiting example only and it is obvious that modifications and variations may be made without departing from the scope of the present invention.

There is claimed:

1. A work clamp for clamping a workpiece to a surface of a work table, said work clamp comprising:

a casing having means for fixing said casing to the work table;

a rotatable element mounted in said casing for rotation about an axis parallel to the work table surface;

an elongated arm slidably mounted in said rotatable element, said arm being formed to have a free end extending outside said casing in a direction substantially perpendicular to the axis of rotation of said rotatable element;

a bearing skid mounted on the free end of said arm for engaging the workpiece to clamp same to the work table surface; and means operatively connected to said rotatable element and said casing for rotating said rotatable element and said elongated arm about said axis of rotation, said rotatable element having a central cylindrical opening coaxially aligned with said axis of rotation for receiving two substantially identical, generally L-shaped, circular flange members arranged in a complementary manner to provide between them a central housing for receiving said arm at said axis of rotation.

2. The work clamp according to claim 1, wherein said flanges are fixed to each other by means of screws passing through one flange and retained in a threaded hole in the other flange.

3. The work clamp according to claim 1, wherein said central cylindrical opening and flange members extend through said casing and wherein each of said flange members has an annular shoulder engaging an annular surface of said casing surrounding said central cylindrical opening.

4. The work clamp according to claim 3, including means for centering at least one of said flange members in said central cylindrical opening when said members are received in said opening.

5. The work clamp according to claim 1, including means for retaining said arm in a desired position of extension from said rotatable element.

6. The work clamp according to claim 1, wherein said means for rotating said rotatable element comprises a lead screw meshing with a toothed sector secured to the rotatable element, said lead screw being mounted in the casing and having a head which projects from said casing and by which said lead screw can be rotated.

7. The work clamp according to claim 1, wherein said free end of said elongated arm is curved to have a concave surface facing the surface of the work table to which the work piece is clamped.

8. The work clamp according to claim 1, wherein said free end of said elongated arm is curved to have a concave surface facing the underneath side of the surface of the work table to which the work piece is clamped.

* * * * *